Fig. I

INVENTORS
JAMES G. HAMRICK
MILTON O. LEE
ARIADNE L. LOEWENTHAL
RUDOLF LOEWENTHAL
BY Alexander & Dowell
ATTORNEYS INVENTORS
JAMES G. HAMRICK
MILTON O. LEE
ARIADNE L. LOEWENTHAL
RUDOLF LOEWENTHAL
BY Alexander & Dowell
ATTORNEYS INVENTORS
JAMES G. HAMRICK
MILTON O. LEE
ARIADNE L. LOEWENTHAL
RUDOLF LOEWENTHAL
BY Alexander & Dowell
ATTORNEYS INVENTORS
JAMES G. HAMRICK
MILTON O. LEE
ARIADNE L. LOEWENTHAL
RUDOLF LOEWENTHAL
BY Alexander & Dowell
ATTORNEYS INVENTORS
JAMES G. HAMRICK
MILTON O. LEE
ARIADNE L. LOEWENTHAL
RUDOLF LOEWENTHAL
BY Alexander & Dowell
ATTORNEYS

INVENTORS
JAMES G. HAMRICK
MILTON O. LEE
ARIADNE L. LOEWENTHAL
RUDOLF LOEWENTHAL

BY Alexander & Dowell
ATTORNEYS 3,435,414

PRINT READING SYSTEMS

James G. Hamrick, Rockville, Milton O. Lee, Bethesda, and Ariadne L. Loewenthal and Rudolf Loewenthal, Rockville, Md., assignors, by mesne assignments, to Numo-Trans Data Corporation, Bethesda, Md., a corporation of Maryland Filed Jan. 5, 1965, Ser. No. 423,541
Int. Cl. G06k 9/08; G06f 11/04
U.S. Cl. 340—146.3 20 Claims

ABSTRACT OF THE DISCLOSURE

A compact machine for automatically reading documents printed with particular font styles, samples of which have been pre-recorded on a cyclically repeating member so that each character in the document can be compared with the pre-recorded series of characters to obtain an exact match. When a match is obtained, the machine reads out a signal uniquely representing the matched character and comprising a "machine" language, such as a binary code, which is suitable for use with computers, printing machines, etc., and can be readily recorded for storage. The illustrative embodiment reads and advances microfilmed documents, and includes means for presetting the maximum width of the lines of print, the maximum number of lines per page, and means for rapidly scanning blank areas on a page to save time in the reading process. Additionally, a further time saving feature includes means for noting the set-width of each character identified, and means for advancing the scan along that line of print by exactly that set-width as soon as an exact match occurs so that the matched symbol is promptly moved just out of the matching zone to make way for the next. Those characters having strong mutually-similar characteristics are arranged on the pre-recorded member in such a sequence that the simplest character becomes a candidate for matching before the next more complicated similar character, this sequence avoiding ambiguities of matching. Since the criterion is substantially a "perfect" match, the present system adjusts its matching sensitivity according to the area of each pre-recorded character as it arrives in the matching zone so that for very large characters the system is less sensitive to minor mismatches than for very small characters whose total area is not much greater than the possible mismatch area of a very large character. Provision is made for attempting each match in plural displaced positions designed to take account of possible minor misalignments of characters on a printed page, but after several such attempts if the machine encounters a character it cannot match, it stops and indicates a failure, and an operator can then manually enter a suitable character from a keyboard supplied for this, and other, purposes.

This invention relates to systems for automatically translating printed characters into machine language taking the form of a multiple-bit binary code which is of a type acceptable to information storage and retrieval systems, and which can be transmitted to remote equipment, for example taking the form of magnetic or punched-tape recorders.

It is a principal object of the present invention to provide a practical system of the above description which functions automatically to recognize printed or typewritten characters and translate them into a coded output, but which machine is not unduly complex or expensive to manufacture. The invention is illustrated in terms of an embodiment which reads characters by projecting one character at a time onto an optical scanning device which includes a lexicon of characters of the same face font as the characters recorded on the microfilm, the system seeking an exact match between the projected character and one of the characters recorded in the scanning system. The illustrative embodiment shown in the present drawings employs the projection of microfilmed documents in order to take advantage of the ease of handling of microfilm and the availability of commercial equipment for handling and projecting microfilm. However, it is to be understood that the present invention contemplates other forms in which projections are made directly from the printed page of a book or from stacked sheets of paper.

In order to avoid a greater electrical and mechanical complication which results in more complex systems of the type designed to read print by scanning various component parts of each character in an effort to recognize it by a process of logical acceptance and rejection of the scanned components, the present system uses the simpler approach of comparing each printed character with characters of the same font recorded in adjacent sectors around a rotating character-recognition drum. Although the present illustration is made in terms of a drum having only a single annular band of characters, it is expected that a practical machine will include multiple adjacent bands respectively representing common fonts arranged in side-by-side bands on the character-recognition drum, and the system including means for selecting the particular band representing a font matching the document being read. Such a machine should also include convenient means for exchanging character-recognition drums in order to make the machine more versatile from the point of view of increasing its recognition capability.

It is another object of the invention to provide a novel scanning system including photoelectric cells on one side of the character-recognition drum and oriented with respect to the projector to receive the light of the projected character, which character may be partially or entirely masked out by the opaque-mask characters recorded on the drum. Adjacent to each of the recorded mask characters on the drum, there are other groups of bands, for example, one group providing a multiple-bit binary code uniquely identifying each character, and another group providing a code which contains information as to the set-width of each of the characters. This latter information is useful in advancing the optical scanning system to bring the next character into view for recognition after a character to which the width information relates has been recognized. The present system further includes precision means for precisely aligning the projected characters with the mask characters on the rotating drum, the alignment being made in directions which are measured both axially and circumferentially with respect to the axis of the character-recognition drum.

Still another important object of the invention is to provide means for measuring the intensity of light of each projected character as it becomes a candidate for recognition, and using this information to vary the sensitivity of the character-matching photoelectric cell circuit for the purpose of compensating the system for the unavoidable fact that certain characters, such as an "M" or a "W" have very large areas as compared with the much smaller areas of certain other characters, such as a period or a comma. A large letter, even though matched almost perfectly with an opaque mask, will permit a small amount of fringe light to leak around its periphery and into the character-matching P.E. (photoelectric) cell. The light leakage around a large character may be of the same order to magnitude as the total amount of light which would be passed to the cell, for example, by the unmatched projected image of a comma superimposed upon the opaque mask of a period. Therefore, a much greater degree of reliability can be obtained if the system is compensated in advance to adjust its sensitivity in inverse ratio with respect to the total amount of light projected to represent a character about to be matched.

The use of an exact character-match system (of the general type shown in U.S. Patents 1,915,993; 2,026,329; 2,985,366; 2,933,246 and 2,240,546) not only reduces to an enormous extent the computer complexity required to make an operative system as compared with "selected-point" matching systems (of the general type shown in U.S. Patents 2,487,511; 2,898,576 and 2,978,675), but the inherent capability of a practical machine is greatly increased since the machine can be made to read any machine-written characters which repeat with sufficient definiteness that their contour can be recorded on the rotating character-recognition drum. In this way, the present invention can be used to read unusual print such as oriental characters, mathematical notations, or even picture symbols and characters, it only being required that the written communication employ a definite and repeating character face. Whatever the characters being read, the only change necessary to make the present system capable of reading it is to change the stored characters on the matrix drum, or to change the matrix drum itself.

Another important object of the invention is to provide an improved character-recognition system in which each character, as it becomes a candidate for recognition, is cast upon the rotating drum carrying the complete font. At the instant when an exact match is obtained, the character-identification and the character-width codes are read, and the recognition system is rendered inoperative during the remainder of that revolution of the recognition drum and additionally until the next character has been brought into position for recognition. Since the recognition system is immediately disabled as soon as an exact match has occurred, it is advantageous to arrange the character masks on the drum in a sequence designed to prevent ambiguities. For instance, the letters "C," "O" and "Q" bear considerable similarity. The opaque mask on the recognition drum for the letter "Q" would complete block light from a projected "O," thereby resulting in an erroneous recognition. Likewise, the mask for the letters "Q" or "O" might virtually block a projected "C" sufficiently to provide an erroneous recognition. However, if the letters are arranged in the sequence C, O, Q on the drum, the first letter to provide an exact match will be the correct letter. For instance if the letter "C" is projected it will immediately match the "C" on the drum thereby disabling the recognition circuit to avoid erroneous matches at the letter mask "O" or "Q." If the letter "O" is projected, it will fail to match the "C"; it will match the "O"; but it cannot match the "Q" since the matching circuit is now disabled. If the projected letter is a "Q," it will fail to match at the C-mask and at the O-mask because of the small tail on the Q, but it will match properly at the Q-mask. Other letters which can result in ambiguity comprise for example the letters E and F. There are, of course, many others, and the proper sequence for recording on the character-recognition drum will vary according to the style of type.

Although the present invention is illustrated in terms of a drum having all of the characters serially arranged in a desired sequence on a single band, it is also contemplated that a split image can be projected on several different bands on the drum arranged so that multiple character masks can be simultaneously scanned for recognition. This would provide a convenient means for greatly increasing the scanning rate of the machine.

Another important object of the invention is to provide means for moving the projected character through a plurality of successive positions with respect both to the vertical and the horizontal locations of characters upon the printed page. If the axis of the rotating drum is parallel with the printed lines being scanned, each character mask on the drum is swept vertically across the projected character so that any vertical misalignment of the character on the printed page will be compensated for, providing it is within reasonable limits. The present system also provides means for repositioning the scanned character intermittently along the drum in the axial direction so as to eventually bring the projected character into exact horizontal alignment with the corresponding character mask on the drum. In this way, each projected character will eventually be precisely aligned with the corresponding character on the mask.

Novel means is also provided for determining whether a printed character is present, or whether the system is scanning a blank space. If a projected character is actually present within the character matching zone, but the system is unable to recognize the character after a certain number of attempts, perhaps as the result of a skewed or deformed character, the machine then stops further scanning and issues an alarm indicating a failure in recognition. The present system is provided with a keyboard by which an operator can manually insert a character which he recognizes but which was unrecognized by the automatic system, thereby setting the system in automatic operation again.

It is another object of the invention to provide a system in which the presence of a space is automatically recognized and recorded, and in which the system then continues to scan along the same line in search of the beginning of the next character. When the system finds the beginning of a subsequent character, it then ceases continuous scanning along the line and goes back to scanning in small increments of movement until the character becomes horizontally aligned and is recognized.

Still another object of the invention is to provide front panel controls by which the system can be preset to scan the maximum number of lines per page of the document being read, and preset to scan the number of increments of horizontal scanning which must be accomplished in a line of maximum length when reading a particular document. Each time the system has scanned horizontally through the manually preset number of horizontal increments, the scanning system is automatically reset to begin scanning on the next line. When the preset number of lines per page has been scanned, the scanning system will automatically be reset to commence reading the beginning of a new frame of the microfilm which is automatically moved into operative position in the projector. The present system is automatically operative to read print having any spacing between characters and/or words, and having any spacing between the lines of print, without requiring any manual preadjustment.

Still another important object of the invention is to provide means for casting an image of the characters being read onto a translucent window on the front panel of the instrument, the window having two vertical lines defining a character-recognition zone within which the character which is a candidate for recognition must appear. The window is wide enough to permit reading of characters on both sides of the one within said zone so that an operator can determine by context the identity of a character which the machine fails to recognize. Means is provided for the operator to manually center the projected character between the two vertical lines on the window prior to striking the keyboard to supply the deficiency, this manual centering being desirable so that when the system subsequently moves to resume automatic scanning, it will move through a distance which is determined by the set-width of the character just manually supplied by the operator, this width being automatically taken from the spacing code recorded on the character-recognition drum adjacent to the particular character manually inserted from the keyboard by the operator.

Other objects and advantages of the invention will become apparent during the following discussion of the practical embodiment illustrated in the present drawings, wherein.

Figure 1:
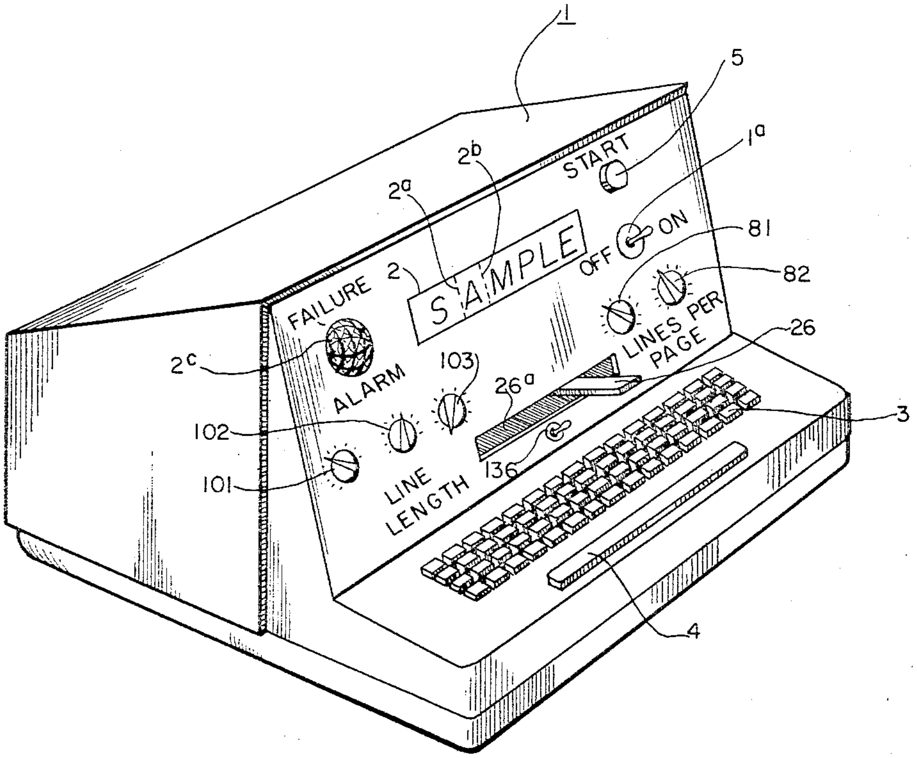
FIG. 1 is a perspective view of the outside of a cabinet containing a system illustrating the present invention and including a manual keyboard to be used for the purpose of inserting data into the print reading system.

Referring now to the drawings, FIG. 1 shows a cabinet 1 having a front panel including suitable controls, such as an "On-Off" switch 1*a*, a "start" button 5, a ground glass window 2 for viewing the character being scanned for recognition and its neighboring characters, and a manually operated lever 26 extending from a slot 26*a* to permit moving of the characters back and forth to center a particular character which is a candidate for recognition with respect to two etched lines 2*a* and 2*b* on the window, which lines define the boundaries of the character-recognition zone of the system. The front-panel controls also include a set of switches 81 and 82 by which the operator can preset the maximum number of lines expected to be found on any page of the document being read, and further include a second set of switches 101, 102 and 103 by which the operator can preset the number of horizontal scanning-motion increments which the system must traverse in covering one line of print on any page of the document. The present system includes both an automatic print reading system, and also means for interrupting the automatic operation sequence in the event that the system is unable to identify a particular character. This might, for example, occur in the event that the document being read includes a letter which is not found upon the character-recognition drum, or in the event that the document being read includes a skewed or deformed character with regard to which an exact match cannot be had.

The system scans the print one character at a time, and the character being scanned, together with several neighboring characters, appears at the window 2, FIG. 1, which in the present illustration shows the character "A" between the lines 2*a* and 2*b* in the character-recognition zone. In the event that the system is unable to identify a character and is automatically halted, an alarm light 2*c* is lighted warning the operator of the system that he must manually supply the deficiency by pushing the appropriate key on the typewriter keyboard 3. If the unidentified character is actually a space containing for example an ink smudge or other spurious blot, he can skip over it by depressing the space bar 4.

More details of the various front panel control functions will be supplied hereinafter.

OPTICAL SYSTEM

Figure 2:
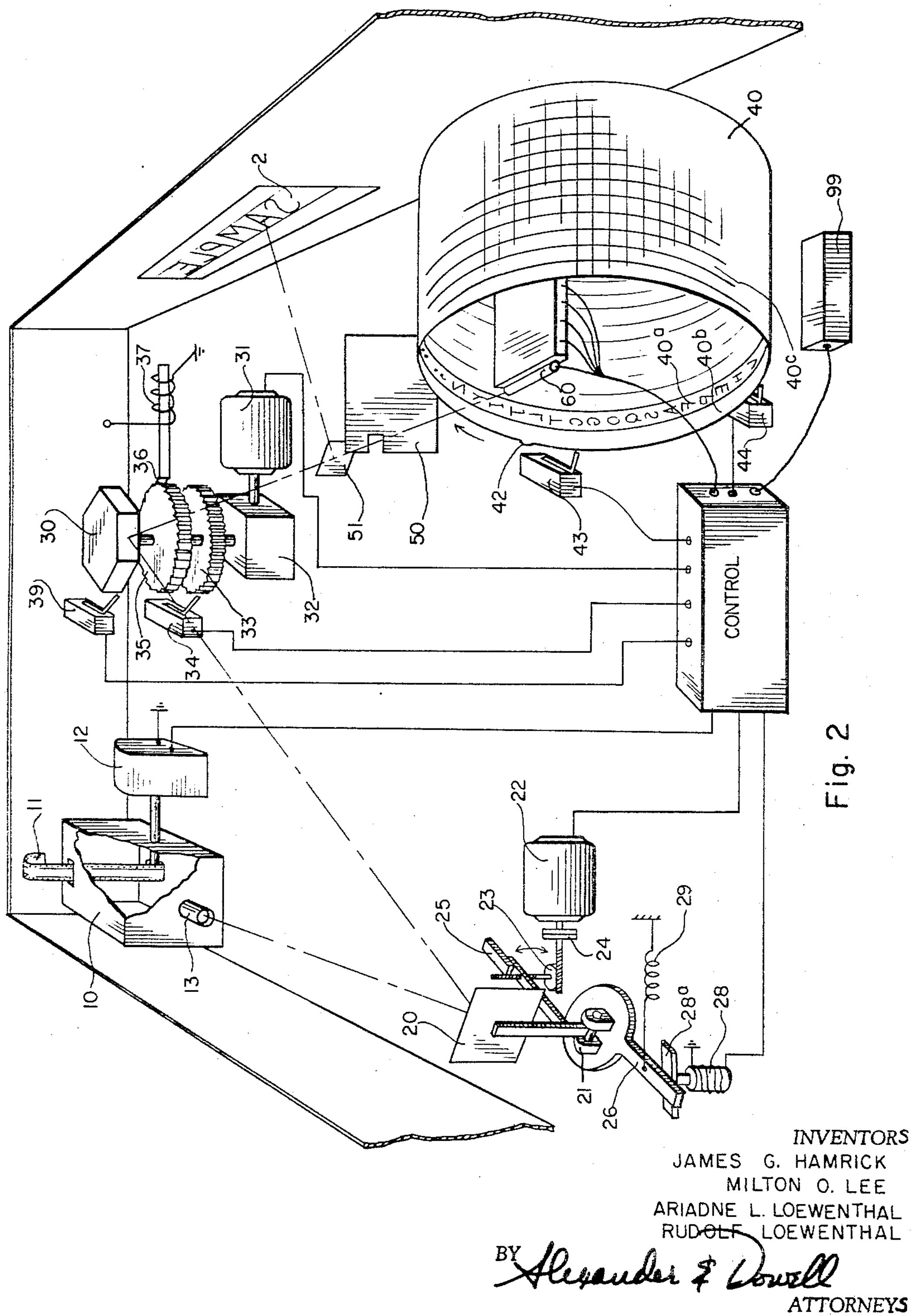
FIG. 2 is a pictorial diagram of suitable optical components located inside of the cabinet, and mutually oriented along optical light paths.

Referring now to FIG. 2, some of the principal mechanical and optical features of the invention are shown in this figure. They include: a projector 10; a mirror 20 which serves the purpose of determining which line on a projected page of print is being read; another mirror 30 which serves the purpose of horizontally moving the characters one at a time into position to be read; a character matrix drum 40 which contains a complete sequence of characters of a particular type face and font, or perhaps several common fonts; a mask 50 for masking lines above and below the line which is being read; and a small split image mirror 51 which serves the purpose of projecting part of the light of the character being read upon the ground glass window 2 located on the front panel of the cabinet 1.

For present illustrative purposes, and because of the relative ease of handling microfilm, the embodiment of the present invention which is illustrated in the drawings is suitable for reading microfilmed pages of documents, the microfilm being labeled 11 in FIG. 2. This microfilm is advanced one frame at a time by an advancement mechanism (not illustrated) driven by a stepping solenoid 12. This solenoid moves the microfilm 11 one frame each time it is energized, at precisely timed moments which will be described in detail in connection with FIGS. 4*a*, 4*b* and 4*c*. The projector 10 includes a lens 13 which focuses a selected field of the microfilm upon the mirror 20. The mirror is mounted on a hinge 21 which is in turn mounted on a swivel plate having a handle 26 returned to a selected position by a spring 29 when a brake 28*a* is released by solenoid 28. The mirror 20 can be tilted by the motor 22 using any suitable gearing 23 which is driven through a simple slip clutch 24 as can be seen best in FIG. 4*c*. A stop 25 is provided which limits the upward tilt of the mirror when the mirror is being raised to its uppermost position at which time it will cast an image upon the matrix drum 40 which corresponds with a line line just above the topmost line of print on the microfilm. The mirror will be intermittently scanned downwardly so that it aligns with successive lines of print in a manner to be hereinafter explained. The line of print on the microfilm which is selected by the mirror 20 is cast upon the mirror 30 which is hexagonal in shape and includes six identical mirror facets so as to provide six successive "start" positions for each mirror revolution, whereby the mirror 30 can always be brought to a "start" position without requiring reverasl of its direction of rotation.

After each character is identified, the mirror 30 is rotated by a motor 31 which runs continuously and drives a shaft extending into a gear box and slip clutch 32 which further includes a shaft extending out of the top of the box to support and drive the mirror. This shaft can be stopped in any position without stopping the motor 31, in which event the clutch within the gear box 32 slips. The upwardly extending shaft also carries two disks, including a disk 33 having a series of small cam teeth thereon which operate a microswitch 34 to deliver a pulse of electrical energy each time one of the cams passes it.

The other disk 35 has a series of ratchet teeth around its outer periphery which teeth are releasably engaged by a pawl 36 to form an escapement means which is released by a solenoid 37 which, when energized, retracts the pawl from the teeth to release the disk 35 so that the vertical shaft is permitted to rotate, thereby rotating the mirror 30 always in one direction, clockwise in the present example. A spring 38, FIG. 4*c*, yieldably presses the pawl into engagement with the ratchet teeth when the solenoid 37 is unenergized, thereby arresting rotation of the mirror 30.

As will be explained heerinafter, the mirror 30 in the present illustrative embodiment moves through 360 increments of motion in scanning each line of print and therefore a very large number of ratchet teeth and cams (six times 360) would have to appear on the disks 35 and 33. To reduce this number to a reasonable value, in a working model it would be desirable to insert another gear reduction in the shaft between the top disk 33 and the mirror 30.

Figure 3:
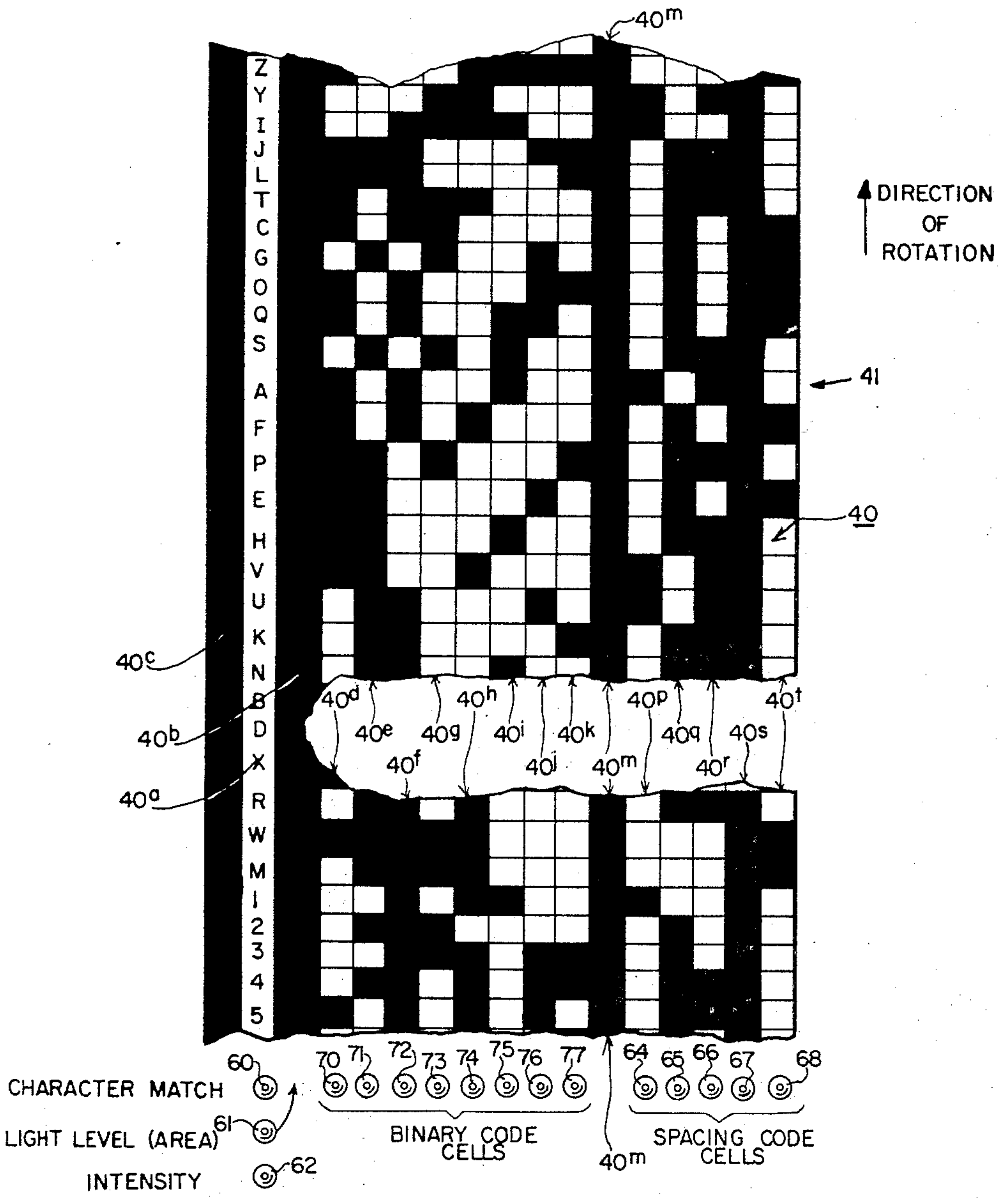
FIG. 3 is a developed view of a length of the character identifying matrix drum used for identifying type of a particular font.

Another microswitch 39 is provided so that it is actuated whenever one facet of the mirror is located in such a position as to project the leftmost character location on a line onto the matrix drum 40, the switch 39 thereby identifying the "start" position when reading the first character in each line of type. The image projected from the mirror 30 impinges upon the matrix drum 40 as shown in FIG. 2, a developed length of the drum 40 being shown in greater detail in FIG. 3.

This drum 40 has a plurality of side-by-side tracks thereon each one of which lines up with a particular photoelectric cell. One track 40*a* of the drum 40 carries the various identifiable characters, each one comprising an opaque mask image of a character and each occupying a different circumferential position in a separate horizontal row with respect to each other character. For example, the letter "A" appears in the row labeled 41 in FIG. 3. Since the system illustrated herein depends upon a substantially perfect match between a light projected character and an opaque mask in the form of the same character upon the band 40*a* of the drum 40, it is necessary to arrange the characters in a sequence differing from normal alphabetical or numerical sequence. This necessity is the result of the fact that an opaque mask, for instance, for the letter "Q," will also completely mask the letter "O." As another example, the opaque mask for the letter "E" will also mask the letter "L" or the letter "F." In order to avoid ambiguities based upon the above examples, and other similarities among the various characters such as the comma and the period, etc., the characters should be arranged on the drum 40 in such a sequence that the least complex character in a sequence of similar characters such as "C," "O," and "Q" always appears first. From the point of view of the electrical circuitry, an exact match is had whenever an opaque mask on the drum 40 blocks out all of the light from the projected character so that the photoelectric cell 60 in FIG. 4*a* goes completely dark. If the letters "Q," "O," and "C" are arranged so that the C-mask occurs first in the sequence, then the O-mask occurs, and then the Q-mask occurs, whenever one of these letters appears in a word the first match which occurs during the rotation of the drum 40 is the correct one, and this match is used to disable the matching circuit for the duration of that revolution of the drum so that no subsequent match can occur.

As the drum rotates if it comes upon the letter "C," a match will occur when the C-mask arrives in the character-identification zone opposite the P.E. cell 60. The fact that the letter C can also be masked out by the subsequent appearance of the O-mask and then the Q-mask has no effect upon the system because the first mask disables the system for subsequent matches during that revolution of the drum 40.

An example of a satisfactory sequence for the characters appearing on a printed page is given by the following, it being understood that the lower-case letters can also be arranged in a similar sequence: ". , : ; Z Y I J L T C G O Q S A F P E H V U K N B D X R W M 1 2 3 4 5 6 7 9 8." There are two tracks 40*b* and 40*c* which serve the purpose of isolating the mask track 40*a* to prevent stray light from possibly interfering with identification of the characters, the bands 40*b* and 40*c* being opaque. The distance between the bands 40*b* and 40*c* at any particular row is proportional to the set-width of the character appearing in that row. To the right of the band 40*b* are eight tracks 40*d*, 40*e*, 40*f*, 40*g*, 40*h*, 40*i*, 40*j*, and 40*k*. These eight tracks comprise an eight-bit binary code which uniquely identifies the character in the same horizontal row, this binary code being read by the present system whenever the letter in the same row is identified by a perfect match.

The band 40*m* is opaque, and again serves the purpose of isolating the bands 40*b* through 40*k* from the five bands located to the right of the band 40*m*.

To the right of the band 40*m* there are five additional bands labeled 40*p*, 40*q*, 40*r*, 40*s*, and 40*t*, and these bands serve to indicate the set-width of the character mask appearing in the same horizontal row, so as to provide information to enable the mirror 30 to advance precisely the right amount to remove the character just identified from view and move the next character toward an identification position.

Except for the isolation bands 40*b*, 40*c*, and 40*m*, each of the other bands aligns with and controls the light furnished to one or more photoelectric cells located thereopposite. These photoelectric cells are labeled 60, 61, 62, 63, 64, 65, 66, 67, 68, 70, 71, 72, 73, 74, 75, 76, and 77. The functioning of these cells will be described in greater detail in connection with FIGS. 4*a*, 4*b*, and 4*c* during the description of the manner in which the system operates.

ELECTRICAL SYSTEM

The sequence of operation of the various scanning, counting and gating means can be controlled by a variety of mechanical switching means, for instance, by rotating sequentially-programmed segmental switches, but the present system is illustrated in terms of an electrical logic system which is in keeping with current computer techniques.

Referring now to the diagram formed by placing FIGS. 4*a*, 4*b*, and 4*c* side-by-side, the sequence of operation will be described as follows. Assuming that a microfilm has been placed in the projector 10 and is ready to be indexed into position placing the first frame of the microfilm opposite the lens 13; and assuming further that the other components in the system are in random positions in which they have been left at the time the machine completed its previous operation, a new cycle of operation of the system is initiated by an operator as follows:

*Start sequence*

Figure 4A:
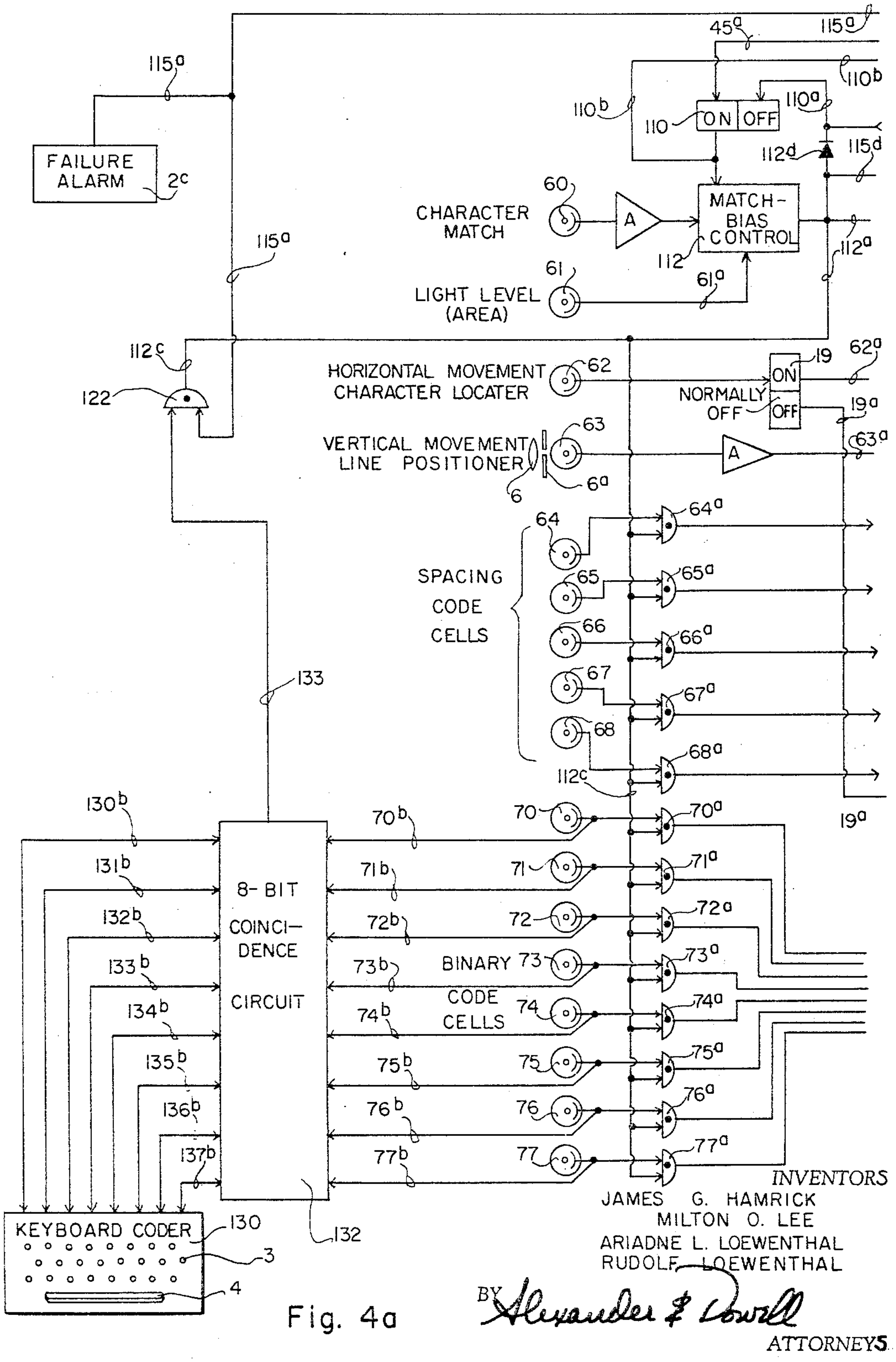
FIGS. 4*a*, 4*b*, and 4*c* when placed side-by-side show a block diagram of suitable circuitry.
Figure 4B:
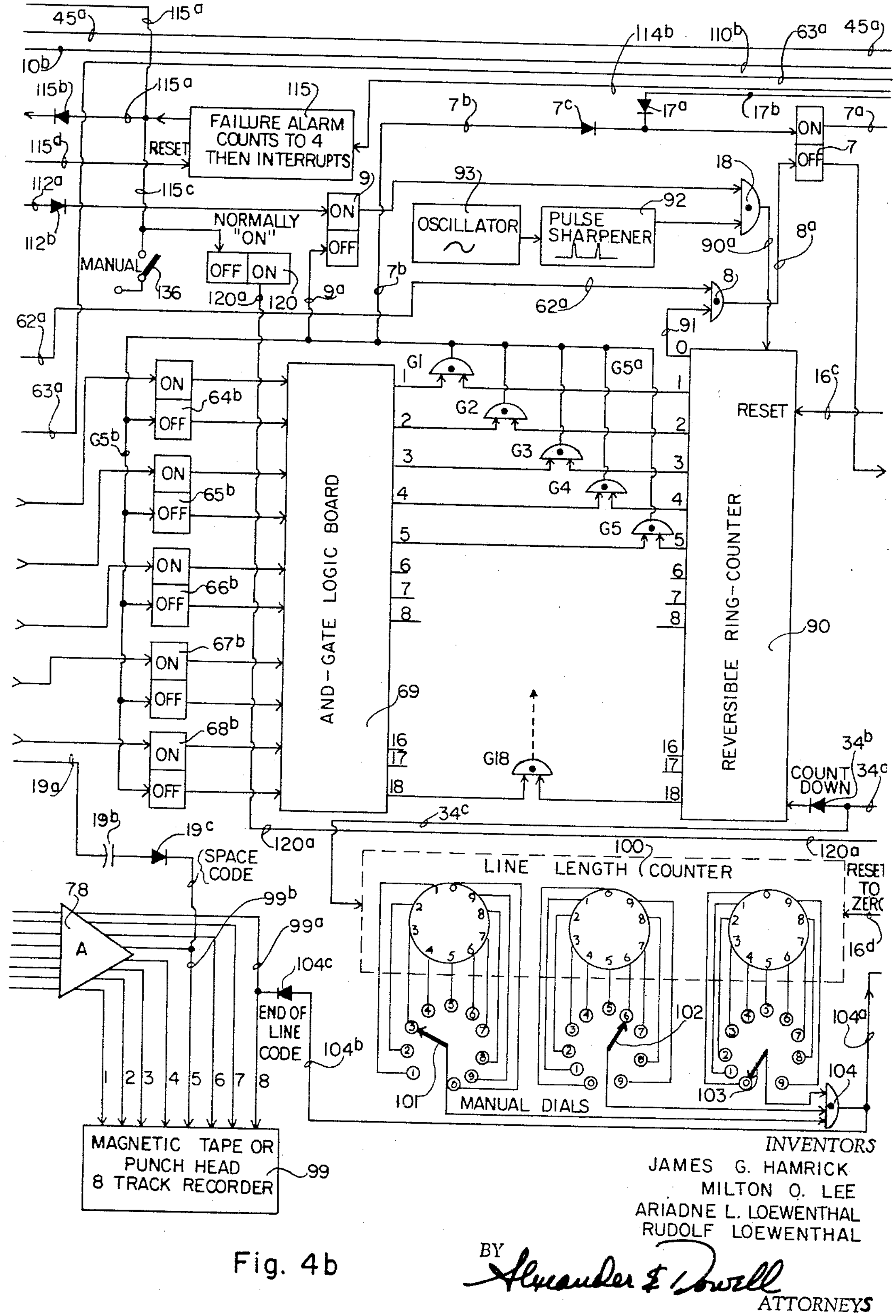
Figure 4C:
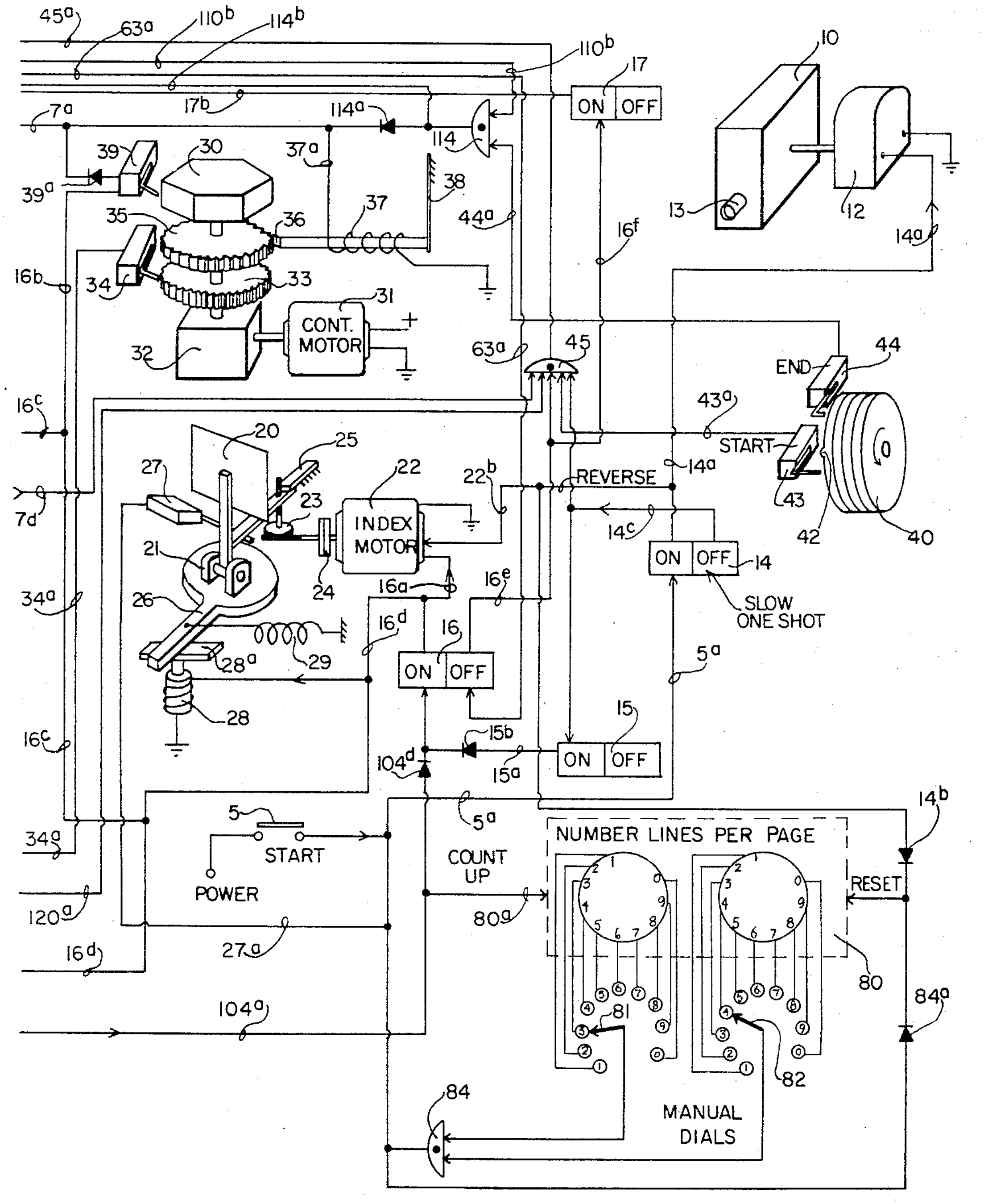

The operator of the system momentarily depresses the "start" switch 5 appearing near the center of FIG. 4*c*, thereby energizing the wire 5*a* leading to a one-shot 14 which normally is in "off" condition and is stable only in "off" condition of conductivity. The time constant of the one-shot 14 is made long enough to permit all of the mechanical devices to reset to starting condition regardless of the positions in which they were located at the time that the "start" switch 5 was depressed.

When the flipflop 14 moves into "on" condition, it energizes the wire 14*a* leading to the film indexing solenoid 12 to advance the microfilm 11 to the first frame to be read. The "on" output of the one-shot 14 also energizes the "reverse" wire 22*b* of the motor 22 which then drives the gear 23 through the slip clutch 24 in such a direction as to raise the mirror 20 to its highest position. Upon reaching this position a stop 25 is encountered and although the motor 22 continues running until the one-shot 14 returns to its "off" condition slightly later, the clutch 24 slips while the mechanism is in contact with the stop 25. The wire 14*a* also connects through a diode 14*b* with the reset terminal of a counter 80 to reset this counter to zero. The counter 80 is capable of counting any number up to the maximum number of lines which are expected to be encountered on a frame of the particular microfilm being processed. The counter has two decimal stages and can count to 99, all of the decimal positions being selectible by two manual switches 81 and 82 which can be set to select any two digits of the counter. The switches in the present drawing are set in such position as to select the count 34. The function of this counter will be described in greater detail hereinafter. It is enough to mention here that the counter 80 is reset as part of the initial control sequence after the "start" switch 5 is depressed.

At the end of the astable time-constant of the one-shot 14, it returns to its stable condition labeled "off" and in doing so delivers a pulse to the wire 14*c* to turn "on" the one-shot 15. The one-shot 15 is similar to the one-shot 14 except that it has a shorter time constant only long enough to trip the bistable flipflop 16 to its "on" position. In other words, since the flipflop 14 is usually in "off" condition, and since it is desirable for the one-shot 14 when it reaches its "off" condition to supply only a long enough pulse to momentarily trigger the flipflop 16 to its "on" condition, the function of the one-shot 15 is to convert a continuous signal arriving on wire 14*b* into a brief pulse signal departing on wire 15*a* and passing through the diode 15*b* to turn the flipflop 16 "on."

The flipflop 16 in its "on" position performs a number of functions as follows: the wire 16*a* delivers an output to drive the motor 22 in the forward direction, thereby lowering the mirror 20 to sweep down the frame of the microfilm until it encounters the first line of print on that frame. A lens 6 placed in front of photoelectric cell 63 condenses a line of print to make a narrow band of light out of it, and when this band of light passes through the slit plate 6*a* and falls upon the photoelectric cell 63, FIG. 4*a*, the output of the cell 63 is amplified and delivered along the wire 63*a* to turn the flipflop 16 off, meaning that the mirror has now positioned the first line of print on the microfilm frame ready for reading.

Before the flipflop 16 is turned off, however, another output therefrom on the "on" wire 16*b* travels upwardly to a normally-closed microswitch 39, this output passing through the normally-closed switch and the diode 39*a* and energizing the wire 7*a* and 37*a*, thereby energizing the ratchet release solenoid 37 to retract the pawl 36 from the teeth 35 and release the mirror 30 to commence rotating. As long as the switch 39 is closed, the mirror 30 continues to rotate, but when one hexagonal point of the mirror drum touches the actuator on switch 39, the switch is opened and the solenoid 37 is deenergized, thereby stopping the mirror in the desired "start" position. The switch 39 is located in such a place that the hexagonal point will open it precisely at the moment when the mirror 30 is lined up with the left-hand edge of a line. This is a location to be preselected for a particular projecting mechanism when making the microfilm, and does not necessarily mean that there is any print this far left on the film. The mirror will tend to remain in this position since the switch 39 is held open by it.

The wire 16*b* also connects through the wire 16*c* to the zero reset terminal of a reversible ring counter 90 to reset this ring counter to zero, for the purpose hereinafter discussed.

The "on" output from the flipflop 16 also travels down a wire 16*d* into a line-length counter 100 which counts the number of increments of spacing in the longest line expected to be found upon the printed microfilm frame and serves the purpose of indexing the mirror 20 to the next line once the prescribed number of spacings have been counted by the counter 100. This number is manually selectable using switches 101, 102 and 103 which can be set to certain positions depending on the length of the line of print on a microfilm frame and on the type face and font used. These increments of spacing do not represent the number of characters on a line, but rather represent a number of increments of motion of the mirror 30 which can be conveniently related to the number of type width units of the particular font used in printing the page. In the illustrative embodiment it is assumed that there are 72 type-width units per lineal inch of the full size page before it is microfilmed, or after the microfilm has again been enlarged to its full size by projection. Therefore, the mirror 30 is made to move through 72 increments per scanned inch, although this is an arbitrary selection which can easily be changed. The switches 101, 102 and 103 are shown set for 360 divisions per line, which would mean about five inches of print per line.

Recapitulating, at this point in the cycle, and as the direct consequence of depressing the "start" button 5, the counters 80, 90 and 100 have all been reset to zero; the microfilm has been indexed in the projector to a new position, the mirror 20 has been aligned with the first line of print on the page, and the mirror 30 has been moved to such a position that it aligns with the extreme left-hand position on a line. All of the flipflops 7, 14 and 16 are now in their "off" condition, and therefore there is no further motion of the mechanical elements which are used to select and align print with the matrix drum 40.

*Character identification*

The drum 40 has a cam 42 on its side surface which is capable of striking the actuators on two microswitches 43 and 44 which are spaced apart, for instance about two-thirds of the way around the drum 40 in the direction of its rotation. The microswitch 43 is positioned such that the first recognition character in band 40*a* on the drum 40 is just coming into alignment with the character match photoelectric cell 60, FIG. 2, when this microswitch is tripped by the cam 42 to deliver a brief pulse. This microswitch 43 always delivers a pulse at the beginning of each new rotation of the drum 40 as it runs through the character-matching mask images in band 40*a*, and this output is delivered through the wire 43*a* to an AND-gate 45. If all of the motion-control flipflops and one-shots including the components 7, 14 and 16 are in "off" condition, and if "normally on" one-shot 120 (serving the purpose hereinafter described) is "on," the outputs on the wires 7*d*, 14*c* and 16*e* and 120*a* will enable the AND-gate 45 so that the pulse from the start switch 43 can pass through the gate 45 to the wire 45*a* and trigger the flipflop 110 to "on" condition, thereby enabling the character matching circuit 112 to place it in readiness to determine when a successful match of the character projected has been made with respect to the mask characters on the drum 40. The AND-gate 45 serves the purpose of disconnecting the start switch 43 from the flipflop 110 whenever any of the mirror or the microfilm advance mechanisms are still in motion, not having reached a stable condition. As soon as all motion has ceased with respect to all of the mechanical moving parts except the continuously rotating drum 40, the gate 45 will again be enabled so that a search can be conducted for an actual character match.

The last flipflop to be returned to "off" position will be the flipflop 16, and its output along the wire 16*e* travels upwardly through the wire 16*f* and momentarily trips the one-shot 17 to "on"-condition, thereby delivering a brief pulse through the coupling diode 17*a* to turn the flipflop 7 "on." The one-shot 17 has a short time-constant and is similar to the one-shot 15. When the flipflop 7 is in "ion" condition, it delivers an output on the wire 7*a* and thereby energizes the ratchet release solenoid 37 permitting the mirror 30 to rotate as long as the solenoid 37 remains energized. The purpose of releasing the mirror 30 to rotate is to cause it to sweep along the selected line of print until it comes to a character.

In the present illustration, the projector 10 projects through a negative film 11 so that light is projected only if print is found on the microfilm, the projector effectively having a dark output as long as there is no print in the area being cast upon the drum 40 by the system of mirrors. As the mirror 30 slowly rotates, eventually it comes upon the leading edge of a character in that line, and when this occurs, there is an output from the photoelectric cell 62, the purpose of which is to detect the beginning of a letter projected upon the drum 40 by the projector 10. As long as the photoelectric cell 62 is picking up the light from the leading edge of a character, it holds the normally-off one-shot 19 "on" and energizes the wire 62*a*, and this signal is delivered to the gate 8, thereby enabling its upper input. As stated above, the reversible ring counter 90 was reset to zero position just after the "start" button 5 was depressed, and therefore delivers a "zero" count output signal on the wire 91 to enable the lower input to the AND-gate 8. As soon as there is an output from the P.E. cell 62, an output signal is delivered on the wire 8*a* to turn the flipflop 7 "off" and stop the rotation of the mirror 30 by de-energizing the ratchet release solenoid wire 37*a*. Thus, an image has at least partly entered the character identification zone on mask track 40*a* of the drum 40.

In an earlier statement, it was shown how an output from the microswitch 43 is delivered at the beginning of each cycle of the drum 40 through the gate 45 when all of the mechanisms are in stable condition, and through the wire 45*a* to turn the flipflop 110 to "on" condition, thereby enabling the character match circuit 112. The character which actuated the photoelectric cell 62 to stop the mirror 30 from rotating, is now projected upon the band 40*a*, although perhaps offset toward one edge thereof. The drum 40 has now passed the "start" position, and continues its revolution in an effort to match the character projected upon the drum with one of the black mask characters in the band 40*a*. Probably it will not be able to do so since the character being matched has not yet been centered horizontally on the band 40*a*. Assuming that there is no match, the cam 42 on the drum 40 will trip the microswitch 44 to send out a momentary pulse signifying the end of the succession of characters in the band 40*a*. As will be explained later, if a match occurs, the flipflop 110 is immedately turned "off" through the diode 112*d* and the wire 110*a* but if no match occurs, the flipflop 110 will remain "on" and will continue delivering an output along the wire 110*b* to enable the upper terminal of the AND-gate 114. Thus, when a pulse is received from the switch 44 signifying the end of an unsuccessful scanning cycle and the wire 110*b* is still energized signifying that no match was obtained, the brief pulse arriving on the wire 44*a* will pass through the AND-gate 114 and the coupling diode 114*a*, thereby briefly energizing the ratchet release solenoid 37 to retract the pawl 36, and then immediately release it to be returned by the spring 38 into contact with the teeth on the disk 35. As a result, the mirror 30 will be allowed to index just one tooth position, which is the least motion which the mirror 30 can make. In this way, the projected character will be advanced further toward the center of the band 40*a*. When the drum 40 makes another revolution, if there is still no character match, the mirror 30 will be allowed to advance through another small increment with the result that the character will be moved further toward the right-hand portion of the band 40*a*. In this way, after each unsuccessful attempt at a match by the drum 40, the mirror is advanced to move the character somewhat further so that a new attempt can be made to obtain an exact character match.

If for some reason the machine is unable to make a character match despite the presence of light on the cell 62, it is desirable that the machine should not continue on-and-on uselessly moving the mirror 30 in increments until it has fully passed the troublesome spot. Therefore, the counter 115 is provided which counts the number of times the gate 114 passes a signal on the wire 114*b*, and after a predetermined number of attempts, for example four, the counter halts the scanning of the system and lights the alarm light 2*c* to show that manual assistance is required. The manner in which this is done will now be explained as follows:

When the system has made four attempts to identify a character, and has failed all four times, the character will have in every case moved past the center of the character identification zone, with the result that there is no longer any possibility of successfully matching that character. As stated above, the counter 115 will have accumulated four counts through the wire 114*b*, and as a result will deliver an output on the wire 115*a* through the diode 115*b* and into the wire 110*a* to turn "off" the flipflop 110, thereby disabling the character match circuit 112. The output on the wire 115*a* also enables one input to an AND-gate 122. Since nothing has reset the counter 115 at this stage in the cycle the gate 122 will remain enabled. As long as the counter 115 has an output on wire 115*a* signifying an identification failure, the failure alarm 2*c* will also be actuated, the alarm in the present embodiment taking the form of a front-panel light as shown in FIG. 1. The output from the counter 115 also travels down the wire 115*c* to hold the normally-on one-shot 120 in "off" condition, thereby de-energizing the wire 120*a* and blocking the AND-gate 45 so that outputs from the switch 43 cannot turn the flipflop 110 "on" again.

At this stage in the cycle, further automatic progress of the system is blocked and the system remains in blocked condition while the operator looks at the character located between the vertical lines 2*a* and 2*b* on the ground glass window 2, and determines what character is represented by the image therein. Having determined the character, the operator then depresses the coresponding key on the keyboard 3, thereby establishing a binary code on the wires 130*b*, 131*b*, 132*b*, 133*b*, 134*b*, 135*b*, 136*b*, and 137*b*, this binary code representing the particular character selected by the operator and being identical with the corresponding binary code which represents that character on the bands 40*d*, 40*e*, 40*f*, 40*g*, 40*h*, 40*i*, 40*j* and 40*k* of the drum 40. In other words, the keyboard 3 attaches to and operates a mechanism represented by the block 130 which is similar to a teletype encoding mechanism and creates the same code for each character as appears for the same character on the drum 40. Thus, in the group of wires 130*b* through 137*b* there will be certain wires which are energized to provide a binary-one, and there will be other wires energized to provide a binary-zero. These wires all feed into an eight-stage coincidence circuit 132 which also receives inputs from wires 70*b*, 71*b*, 72*b*, 73*b*, 74*b*, 75*b*, 76*b*, and 77*b*, and these wires instantaneously bearing whatever binary code is read from the character identification drum 40 at the code row which is instantaneously opposite the photoelectric cells 70, 71, 72, 73, 74, 75, 76, and 77, this code changing as the drum 40 rotates.

The coincidence circuit is of conventional design, and includes, for example, eight inverse-exclusive-OR-gates comprising said eight stages and respectively receiving the inputs on wires 130*b* and 70*b*, on the wires 131*b* and 71*b* . . . , through 137*b* and 77*b*. Each inverse-exclusive-OR-gate determines whether the paired wires entering it have the same binary signals or opposite binary signals. If the two inputs to a gate represent the same binary signal, whatever it might be, the gate has an output. On the other hand, if the two input wires have opposite binary signals, the gate has no output. When all eight of the paired wires respectively have corresponding binary inputs, the codes are identical and the coincidence circuit 132 delivers an output along the wire 133, and this output passes through the enabled gate 122 and energizes the wire 112*c* which connects to the wire 112*a*, thereby turning the flip-flop 9 "on" and enabling the gates 64*a* through 68*a* and the gates 70*a* through 77*a*.

As pointed out above, the binary code arriving on the wires 70*b*, 71*b*, 72*b*, 73*b*, 74*b*, 75*b*, 76*b*, and 77*b* changes as the drum 40 rotates. Therefore, the coincidence circuit 132 will have an output on wire 133 when the drum 40 has rotated to the position where the character recorded on the drum 40 is the same as the character selected by the operator-depressed key on the keyboard 3. In this way, the operator artificially signifies a perfect match, and precisely at the moment when this match occurs, the wires 112*c* and 112*a* become energized. In this way, the system is manually actuated by the operator to carry out all of its functions which normally occur as a result of automatic character-recognition. A step-by-step description thereof is given in the following paragraphs.

After the operator depresses the appropriate key on the keyboard, and coincidence occurs, thereby delivering a signal from the wire 133 to the gate 122, the signal on wire 112*c* resets the counter 115 by energizing the wire 115*d*, thereby extinguishing the alarm light 2*c* and blocking the gate 122, at the same time releasing the one-shot 120 to return to its "normally-on" condition, thereby enabling the gate 45 and returning the system to automatic operation. The code has just been read from the drum 40 by the code cells 70, 71, 72, 73, 74, 75, 76, and 77 is also recorded by the recorder 99, and the spacing code cells 64 through 68 determine the width of the character selected by the operator, and move the mirror 30 by an amount appropriate to move the manually entered character from the character identification zone.

Before describing the character-recognition cycle in detail, it should be noted that when the machine failed to recognize the character to which the above discussion relates, this character had already been moved just beyond the center of the character recognition zone where proper identification should occur. For this reason, if the mirror 30 should move the manually entered character by the amount of its width as determined by the cells 64 through 68, the next character would also be moved beyond the point of proper recognition, thereby causing another failure. In order to avoid this difficulty, the lever 26 which extends through a slot 26*a* on the front-panel is provided to permit the operator to horizontally shift the character which the machine failed to identify to center that character between the lines 2*a* and 2*b* of the window 2. The slot 26*a* is long enough to permit several corrections to be made by the lever 26 in a single defective line of print, even though the corrections would always be made in the same direction. However, when a new line of print is about to be scanned, it is desirable to have these manually inserted corrections automatically removed by retracting a friction brake 28*a* out of contact with the lever 26 to thereby permit the spring 29 to return the lever to the rightmost position as shown in FIG. 1. The same flip-flop 16 which energizes the motor 22 to drive the mirror 20 downwardly to read the next line of print also actuates a solenoid 28 to retract the brake 28*a* each time a new line of print is read. Enough lee-way will be added at the end of each line of print as determined by the line-length counter 100 to eliminate the possibility that by moving the lever 26 the operator may have shortened the travel of the mirror 30 by an amount which would keep it from scaning to the full end of the line of print.

Recalling that the system is shifted from automatic scanning and recognition to keyboard manual operation whenever the flip-flop 120 is held in "off" condition, it is desirable to provide a switch 138 by which the operator can make the change to manual even in the absence of a failure. This will permit the operator to make manual insertions of new matter; or to type-in titles, headings, footnotes, etc., as desired.

Normally, as a character under automatic investigation is moved across the band 40*a* on the drum 40 by the mirror 30 a time will come when a perfect match occurs, and this occurrence involves the following sequence:

The box labeled 112 near the top of FIG. 4*a* and bearing the legend "character-match bias control" is in fact a detector which is sensitive to zero output from the character match P.E. cell 60 signifying a perfect match. It will be recalled that the varius characters recorded on the matrix band 40*a* are black on a transparent background, and that the characters projected by the projector 10 are light in the area of each character and dark in the area between characters. If the letter "A" is projected upon the very place on the band 40*a* where the mask letter "A" appears in the row labeled 41, then if the light character projected exactly matches the black "A" on the band 40*a*, the photoelectric cell 60 will go completely dark and will cease delivering an output. When this occurs the character match circuit 112 delivers an output on the wire 112*a* signifying a perfect match, while at the same time the photoelectric cell 62 is delivering a signal signifying that there is a character present and in the process of being matched in order to produce darkness in the P.E. cell 60, rather than the other possibility, namely the complete absence of a character which absence would also produce darkness on the photoelectric cell 60.

Under the circumstances where a perfect match is made there is an output on the wire 112*a* and an output on the wire 62*a*. The output on the wire 112*a* passes through the coupling diode 112*b* and is delivered to the flip-flop 9 to turn it on, thereby delivering a signal to the AND-gate 18 for the purpose hereinafter explained.

A further effect of an output from the wire 112*a* is to deliver a signal along the wire 112*c* which enables the lower input to each of the AND-gates 64*a*, 65*a*, 66*a*, 67*a*, 68*a*, 70*a*, 71*a*, 72*a*, 73*a*, 74*a*, 75*a*, 76*a*, and 77*a*, thereby enabling all of these gates so that all of the photoelectric cells 64 through 68, or 70 through 77, which receive light through the associated matrix drum bands will deliver a signal to their associated gates.

Two purposes are served by enabling these 13 gates. The gates 64*a* through 68*a* are used to pass signals from bands 40*p*, 40*q*, 40*r*, 40*s*, or 40*t*, which represent a five-bit binary code serving to inform the system as to the width of the letter which has just been matched in the same row on the track 40*a*. Whichever of these cells is illustrated by the particular binary code opposite that character, the associated flip-flops 64*b*, 65*b*, 66*b*, 67*b*, or 68*b* will be flopped to the "on" condition, thereby delivering selected "on" signals at their upper wires to a simple AND-gate logic board 69 which, in a manner well known per se, delivers one unique output depending upon the instant permutation of the flip-flop outputs which have been energized by the binary code bands passing light to selected ones of the cells 64–68 inclusive. It will be noted that the logic board 69 has a plurality of outputs numbered 1 through 18, meaning that a character can occupy as many as 18 horizontal width-spacing units or points. At any rate, for each of the binary codes falling upon the spacing code cells 64 to 68 there will be a single output from the right-hand column of output wires of the logic board 69 representing the width of the character just identified. Assume that the fifth output of logic board 69 is energized, for illustrative purposes. This output will go to enable the left input to one of the gates marked G1 through G18. Only the fifth one of these gates can have an input enabled by the output from the logic board 69. The other side of this gate G5 will be enabled when the ring counter 90 has been counted up to the corresponding number.

The counting up of the ring counter 90 results from the counting of pulses from a pulse shaper 92 through the gate 18 at its lower input, it being recalled that the upper input to this AND-gate 18 was enabled by the turning "on" of the flipflop 9 when a character match signal appeared on the wire 112*a*. The pulse shaper 92 is driven by a sine wave oscillator 93 driving it to count at a rapid rate. Thus, it will be seen that the ring counter 90 is being counted upwardly through pulses arriving on wire 90*a*. With the result that the outputs at the left-hand column on the ring counter 90 are successively energized, first counting from zero to 1, but finding that the gate G1 is not enabled at its left-hand input. The next pulse from the pulse shaper 92 counts the ring counter 90 up one more position to provide an output to gate G2. Still there is no output from that gate. After five pulses have been counted into the ring counter 90 and the gate G5 has been enabled at its right-hand input, the gate G5 will deliver an output on wire G5*a* which will in turn deliver this signal into the flipflop 9 on the wire 9*a*, turning the flipflop "off" and thereby blocking the gate 18 so that no further pulses can be counted into the ring counter 90.

The signal on wire G5*a* is also applied to the wire 7*b* through the diode 7*c* in order to turn the flipflop 7 "on" and deliver an output from wire 7*a* to energize the ratchet solenoid 37 and retract the pawl 36 so as to permit the mirror 30 to begin rotating for the purpose of bringing the next character into view on the band 40*a* of the character-recognition drum 40. The output from the wire G5*a* also travels down the wire G5*b* and is applied to all of the "off" inputs of the flipflops 64*b*, 65*b*, 66*b*, 67*b*, and 68*b*, thereby returning all of these flipflops to the "off" position in preparation for the next input.

Returning to the arrival of a signal on the wire 112*a* as an immediate result of recognition of the character in row 41 of the drum which is being currently discussed, the signal travels down to the wire 112*c* and enables the lower inputs to the gates 70*a*, 71*a*, 72*a*, 73*a*, 74*a*, 75*a*, 76*a*, and 77*a*. These gates have their upper inputs connected to the P.E. cells 70, 71, 72, 73, 74, 75, 76, and 77 which are located opposite the bands 40*d*, 40*e*, 40*f*, 40*g*, 40*h*, 40*i*, 40*j*, and 40*k* which bands comprise an eight-bit binary code uniquely identifying the character "A" appearing on the same row 41 in the band 4*a*. For each of these mask characters there is a binary code read by the photoelectric cells 70 through 77 through the gates 70*a* through 77*a* and through the amplifier 78 into a magnetic or punch tape recorder 99, or any other utilization or display device. These inputs will be recorded as binary signals by the recording device 99. The eighth one of these tracks 99*a* is also used to record a marker signifying the end of a line if only the track 99*a* contains a signal, this signal operating the print-out (not shown) carriage return means.

By way of summary, the finding of a perfect match has resulted in the following occurrences: a signal appears on the wire 112*a* and shuts off the flipflop 110 through the diode 112*d*. This signal also enables the binary character-identifying code gates to record what the identified letter is. The signal also enabled the spacing cells 64 through 68 and also commenced the reversible counter 90 counting up to this fifth position which is the assumed width of the letter "A" just identified. When this width is reached, the system stops increasing the count in the counter 90 and unlocked the ratchet to permit the motor 31 to start turning the mirror 30 again.

Having determined that the character identified occupies five units of space, it is now desirable to move the mirror enough to advance it also five units of space in the horizontal direction, thereby moving the letter "A" entirely from the matching area of the band 40*a*. This is accomplished by output from the microswitch 34 which is pulsed each time the mirror moves one unit of horizontal spacing, the cam wheel 33 actuating the microswitch once for each such unit. These outputs from the microswitch 34 travel downwardly on the wire 34*a* and through the coupling diode 34*b* into the count-down terminal of the reversible ring counter 90. The ring counter is currently reading an output at position 5. The first pulse from the microswitch 34 counts it down to position 4, and the next pulse counts it down to position 3, and so on until the fifth pulse counts it back to deliver output at position 0.

At this time if another character is illuminating the P.E. cell 62, the one-shot 19 will be held "on" to energize the wire 62*a* and enable the gate 8 to pass output from the zero-output wire 91 into the wire 8*a* and turn the flipflop 7 "off," thereby stopping the mirror from further rotation. On the other hand, if there is a space following the letter just identified so that the P.E. cell 62 does not see another character right away, the gate 8 remains blocked until a character comes into view and the mirror 30 is permitted to continue rotating until the new character is brought close enough into position that it illuminates the P.E. cell 62. Thus, the mirror 30 continues rotating until it finds another character on the line, unless the end of the line is reached first.

The existence of a space is recorded in channel 99*b* of the recorder 99 by inserting a mark in this channel, but in no other. When a space occurs, the P.E. cell 62 goes dark and its output ceases thereby permitting the "normally-off" one-shot 19 to return to "off" condition, thereby energizing the wire 19*a*. The capacitor 19*b* and the diode 19*c* convert the steady "off" singal into a pulse output delivered to the channel 99*b*, but only when the one-shot 19 goes "off." The transient occurring when it goes "on" is blocked by the diode 19*c*. Therefore, a space signal is recorded in channel 99*b*, every time the P.E. cell 62 finds no character within its field of vision.

Means is provided in the form of a counter 100 by which the system is informed when the end of a line has been reached by the scanning mirror 30 without having encountered any more characters. As the mirror rotates, and always when it rotates, it sends out pulses on wire 34*a* resulting from the cam disk 33 actuating the microswitch 34. These pulses travel through the wire 34*c* and into the "count-up" terminal of counter 100. The position of the switches 101, 102 and 103 determine how many pulses must be counted into the line length counter 100 before the mirror has scanned all the way across the line of print. The settings of these switches is a front panel adjustment made by the operator when placing a microfilm into the projector, the operator determining how many spaces should be found on a line for the particular type font being recognized and for the particular width of the page photographed on the microfilm 11. When the final count is reached, 360 in the present illustration according to the setting of switches 101, 102 and 103, there will be an output at each of the three inputs to the AND-gate 104, thereby providing an output to the wires 104*a* and 104*b*. The output on wire 104*b* passes through the coupling diode 104*c* and records a signal in the last track on the recorder 99 indicating the arrival at the end of a line.

The output from gate 104 on wire 104*a* counts the lines-per-page counter 80 up one position by furnishing a signal on the wire 80*a*. Each time the end of a line is reached by the mirror 30, the counter 80 which accumulates the number of lines on the scanned page is counted up one position until it receives output simultaneously at both of its switches 81 and 82. These switches are also front panel adjustments and permit the operator to set the machine for the maximum number of lines anticipated per printed page in the document being read by the system. The switches in the present illustration are set on 34 lines, and when this number is reached the gate 84 delivers an output to the wire 5*a* and through a diode 84*a* which resets the counter 80 to zero. The output on the wire 5*a* from the counter 80 indicating the end of a page has the same effect as pressing the "start" button 5 as described in the beginning of this discussion. Namely, the microfilm 11 is advanced one position in the projector 10, the mirror 20 is reversely driven to its uppermost position and the mirror 30 is driven around, still in the same direction of movement, and until its next facet is lined up at the left-hand margin. In addition, all of the counters 80, 90 and 100 are reset to zero. This is what occurs after the preset number of lines selected by the switches 81 and 82 have been scanned.

However, when the end of a line has been reached, which is not the last line for which the machine is set, the output from the gate 104 merely counts the counter 80 up one position and delivers a signal through the diode 104*d* to turn the flipflop 16 to the "on" position. When this occurs, the projector 10 is of course not actuated to advance the film, but the motor 22 driving the mirror 20 is turned on again so as to move the mirror downwardly to the next line of print. The mirror is stopped whenever the lens 6 casts a vertically condensed image of the next line upon the P.E. cell 63 through the aperture plate 6*a*, thereby providing a signal on the wire 63*a* which is delivered to the "off" side of the flip-flop 16 to stop the motor 22.

While the flip-flop 16 is "on," and before it is turned "off" a signal is also delivered by it to the wires 16*b* and 16*d*. These outputs include a signal which travels downwardly on the wire 16*d* and energizes the solenoid 28 to retract the brake 28*a* and release the lever 26 to be pulled by the spring 29 to the rightmost position. This signal also resets the line length counter 100 so that it can begin the next line at count zero. A signal which travels upwardly on the wire 16*b* makes certain that the reversible ring counter 90 is in the zero position, and also energizes the switch 39 which is of the normally-closed variety. The signal on wire 16*c* serving to reset the counter 90 to zero usually is not needed because the counter was counted back down to zero during the preceding character-recognition cycle. However, since the machine might be stopped by loss of power in some other counting position, it is though advisable to make sure that it is always properly reset at the beginning of each line-scanning. The switch 39, being energized, releases the ratchet solenoid 37 and allows the mirror 30 to continue rotating until it contacts the switch 39 and opens it with the mirror in the position to read the leftmost end of the new line. Thus, when the end of a line is reached, which is not also the end of a page, the line counter 100 is reset, the lever 26 is returned to its rightmost position, the ring counter 90 is reset, the mirror 20 is moved to the next lower line and the mirror 30 is reset to commence at the left hand margin. When all of these components have been reset, as indicated by their flipflops being in the "off" position, the inputs to the gate 45 along wires *7d*, *16e*, and *14b* will again be energized, so that the next pulse along the wire *43a* from microswitch 43 will turn the flipflop 110 on and thereby permit a new cycle fo character-recognition to commence.

During this new cycle, each time the drum revolves without successfully identifying a character, a brief signal from the switch 44 retracts the ratchet pawl 36 momentarily and advances the mirror 30 by one horizontal position. When eventually a character-recognition occurs, an output appears on wire 112a and causes the reading of the adjacent binary code identifying that character, and further causes the progression of the mirror 30 to a position where it picks up the next character in the line. Where the characters are closely spaced as within a word, the mirror 30 moves down the line by a number of spaces which is determined by the spacing code cells 64–68 reading the rightmost five bands of the drum 40.

In order to speed the operation and make the machine function as efficiently as possible, the switches 101, 102 and 103 permit the operator to set the machine to read a line length which is considered maximum for the document under consideration, but not to waste time scanning beyond this length. The switches 81 and 82 are set so that the machine scans only the maximum number of lines anticipated on a page of that document, but does not waste time scanning below the expected last line.

If a page has fewer lines of print on it than the number preset by the switches 81 and 82, the motor 22 will continue to drive the mirror 20 down, but the P.E. cell 62 will not find a line of print. Instead, the mirror arm will strike and close the switch 27 to deliver a signal along wire *27a* to turn on the one-shot 14 to index the next microfilm frame and reset the whole scanner and the counters.

There is a great deal of different in the amount of light which is put out by the projector 10 when it is projecting a large letter such as "M" or "W," as compared with the very small amount of light that will be put out when a period or a comma is being projected. Therefore, an additional P.E. cell 61 is placed so as to intercept some of the light from the image of the character being projected on the recognition zone as the drum rotates. This P.E. cell 61 reads, in effect, the amount of light which can pass through the whole area of the character, and adjusts the bias of the character match circuit through the wire 61a to compensate for the variation in light projected from one character to another. For example, when the drum 40 introduces the letter "W" for consideration as to whether there is a match or not, the bias on the character match circuit is automatically adjusted such that the circuit is relatively insensitive. On the other hand, when there is a very small character, such as a punctuation mark, being viewed by the light cell 61, the bias is changed on the character match circuit 112 so that it becomes more sensitive. This makes it easier to obtain proper readings in the event that the character match is slightly less than absolutely perfect. A large-area letter, even though substantially perfectly matched, may permit enough fringe light to pass to the character match cell 60 that the cell might react as though it were a "period" which was, for example, totally unmatched. On the other hand, if the sensitivity of the character match circuit 112 were very much reduced regardless of letter area to avoid this possibility, then the cell 60 might not recognize an unmatched period or comma at all. The present system therefore adjusts its sensitivity automatically in response to the total light passed by a character comprising a candidate for a perfect match.

This invention is not to be limited by the present illustrative system for obviously changes may be made within the scope of the following claims.

We claim:

1. A character-recognition system for reading a printed document, comprising:

(a) a member having plural sample characters representing a print style similar to the style in said printed document, the characters being prearranged with respect to a character-recognition zone and said member including code means for identifying each character and for indicating its set-width;

(b) photosensitive means in said zone and including character-match indicating means;

(c) means for scanning said document and for sequentially projecting images of the printed characters into said zone;

(d) character-match circuit means connected to said indicating means and delivering an output signal when a projected character matches a sample character;

(e) means responsive to said signal for enabling said photosensitive means to read said code means and determine the identity and the set-width of the sample character matched;

(f) means responsive to said set-width and responsive to said output for advancing the scanning means through an increment proportional to said determined set-width and then halting such advance; and (g) means for determining whether an image of a character is then present in said zone and for disabling said halting means until an image appears therein.

2. An improved system for automatically scanning and recognizing printed characters, the system being of the type including means for projecting the characters, first means for directing one line of print at a time toward a character-recognition zone, second means for scanning said directed line of print to bring the characters one at a time within said zone, a member having a font of character masks located in said zone and in the path of characters projected thereonto, and character-match determining means including photoelectric means disposed to receive projected light from said member and responsive to the interruption of said light by a matching character mask to deliver an output signal signifying a character match, the improvement comprising:

(a) increment means for advancing said second means through increments representing units of set-width of the characters;

(b) set-width indicating means carried upon said moving member and respectively corresponding with each character mask, and actuated by said output signal to advance said increment means through a number of increments proportional to the set-width corresponding with the particular character recognized;

(c) counter means for totalizing the number of increments advanced by said increment means and for delivering an end-of-line signal when a predetermined count is reached; and (d) circuit means connected to receive the latter signal and operatively connected to said first means to advance it to the next line of print, and connected to reset said counter means, and connected to reset said second means to the beginning of the next line.

3. In a system as set forth in claim 2, (a) a plurality of gates each having plural inputs and each representing a different possible set-width for a character;

(b) logic circuitry connecting the set-width indicating means to enable the one of said gates representing the set-width of a character just identified;

(c) counting means having outputs respectively connected to another input of each gate;

(d) means for counting up the counting means to provide an output to the enabled gate and to thereby deliver a signal therethrough to stop the counting means and to actuate the increment means to advance said second scanning means;

(e) said increment means having means for delivering a signal for each increment advanced and this signal being connected to count-down the counting means toward zero count; and (f) means connected to a zero-count output of the counting means to deliver a signal to the increment means to halt its advance.

4. In a system as set forth in claim 3, (a) a gate interposed between the zero count output and the increment means;

(b) means for determining whether light from a projected character is present in said recognition zone and for enabling the gate when light is present, whereby the zero-count input signal will halt the advance of the increment means only when a character is present in said zone and when the counting means has been counted-down to zero.

5. An improved system for automatically scanning and recognizing printed characters, the system being of the type including means for projecting the characters, first means for directing one line of print at a time toward a character-recognition zone, second means for scanning said directed line of print to bring the characters one at a time within said zone, a moving member having a complete font of character masks passing through said zone in the path of characters projected thereonto, and character match determining means including photoelectric means disposed to receive projected light from said member and responsive to the interruption of said light by a character mask to deliver an output signal signifying a character match, the improvement comprising:

(a) increment means for advancing said second means through increments representing units of set-width of the characters;

(b) set-width indicating means carried upon said moving member and respectively corresponding with each character mask, and actuated by said output signal to advance said increment means through a number of increments proportional to the set-width corresponding with the particular character recognized;

(c) means for determining whether light from a projected character is present in said recognition zone and for maintaining said increment means operative to advance said second means until light from a character appears in said zone;

(d) counter means for totalizing the number of increments advanced by said increment means and for delivering an end-of-line signal when a predetermined count is reached; and (e) circuit means connected to receive the latter signal and operatively connected to said first means to advance it to the next line of print, and connected to reset said counter means, and connected to reset said second means to the beginning of the next line.

6. In a system as set forth in claim 5, (a) said character masks being arranged in a cyclic sequence on said moving member, and said system including means for providing marker signals at the beginning and end of each sequence;

(b) enabling means receiving the beginning marker signals and connected to turn on the match determining means at the beginning of a sequence;

(c) means connected to receive said output signal when a match occurs and connected to turn off said enabling means; and (d) means connected to receive said end marker signal and to be enabled by said enabling means when the match determining means is enabled, and operative to deliver a signal to advance said increment means by one increment each time an end marker signal is received while the match determining means is enabled.

7. In a system as set forth in claim 6, (a) counting means for counting the number of successive increment-advance signals delivered, and connected to receive said character match output signal to be reset to zero thereby;

(b) said counting means having a "failure" output operative after a preset number of counts;

(c) keyboard means for manually inserting a character into the system, and said keyboard means being coupled to said system in response to a "failure" signal;

(d) and means connected with the keyboard means to deliver a character-match output signal to the system when a character has been manually inserted.

8. In a system as set forth in claim 7, (a) a first code means on said moving means delivering a unique identification code for each character mask entering said zone;

(b) second code means operated by said keyboard means and delivering a similar unique code for each keyboard character;

(c) coincidence determining means receiving said first and second codes and comprising said means to deliver a match output-signal when the codes are identical.

9. In a system as set forth in claim 6, (a) said character masks being arranged in a cyclic sequence on said moving member with the characters which have similar characteristic components disposed in the sequence with the simplest characters first followed by similar characters in the order of increasing complexity;

(b) and said means for turning off said enabling means operating to prevent a second match from occurring during the same sequence cycle.

10. In a system as set forth in claim 5, said moving member comprising a rotating member with at least one annular band of character masks, the axis of rotation being disposed substantially parallel with the line of print directed toward said character-recognition zone.

11. An improved system for automatically scanning and recognizing printed characters, the system being of the type including means for projecting the characters, first means for directing one line of print at a time toward a character-recognition zone, second means for scanning said directed line of print to bring the characters one at a time within said zone, a moving member having a complete font of character masks passing through said zone in the path of characters projected thereonto, and character match determining means including photoelectric means disposed to receive projected light from said member and responsive to the interruption of said light by a character mask to deliver an output signal signifying a character match, the improvement comprising:

(a) increment means for advancing said second means through increments representing units of set-width of the characters;

(b) set-width indicating means corresponding with each character mask on said moving member and actuated by said output signal;

(c) a plurality of gates each having plural inputs and each representing a different possible set-width for a character;

(d) logic circuitry connecting the set-width indicating means to enable the one of said gates representing the set-width of a character just identified;

(e) counting means having outputs respectively connected to another input of each gate;

(f) means for counting up the counting means to provide an output to the enabled gate and to thereby deliver a signal therethrough to stop the counting means and to actuate the increment means to advance said second scanning means;

(g) said increment means having means for delivering a signal for each increment advanced and this signal being connected to count-down the counting means toward zero count; and (h) means connected to a zero-count output of the counting means to deliver a signal to the increment means to halt its advance.

12. In a system as set forth in claim 11,
(a) a gate interposed between the zero count output and the increment means;
(b) means for determining whether light from a projected character is present in said recognition zone and for enabling the gate when light is present, whereby the zero-count output signal will halt the advance of the increment means only when a character is present in said zone and when the counting means has been counted-down to zero.

13. An improved system for automatically scanning and recognizing printed characters and transposing them into unique character-identifying codes, the system being of the type including means for projecting the characters in a document, automatic means for scanning the characters on each line of print and for directing them one at a time toward a character-recognition zone, a moving member having a complete font of character masks each associated with means for delivering a code identifying a matched character and the masks passing through said zone and intersecting the path of characters projected thereonto, the improvement comprising:
(a) multiple adjacent annular bands on said moving member including sequential character-recognition masks;
(b) photosensitive cell means disposed opposite said bands and including character-match cell means;
(c) a character-intensity reading cell disposed to receive light from each character projected into said recognition zone to determine the relative light intensities of the various characters projected;
(d) character match determining means connected to said character-match cell and having adjustable threshold means sensitive to the degree to which light from a projected character is interrupted by character masks on said moving member, said adjustable means being connected to said intensity cell to adjust the threshold in proportion to the projected relative light intensities to make the match-determining means relatively more sensitive when seeking a match with respect to a projected character of relatively smaller total intensity, and the match determining means delivering an output signal in response to a character match; and
(e) means connecting said signal to said scanning means to advance it to the next character.

14. In a system as set forth in claim 13,
(a) said character masks being arranged in a cyclic sequence on said moving member, and said system including means for providing marker signals at the beginning and end of each sequence;
(b) enabling means receiving the beginning marker signals and connected to turn on the match determining means at the beginning of a sequence;
(c) means connected to receive said output signal when a match occurs and connected to turn off said enabling means; and
(d) means connected to receive said end marker signal and to be enabled by said enabling means when the match determining means is enabled, and operative to deliver a signal to advance said scanning means through a very small increment each time an end marker signal is received while the match determining means is enabled.

15. In a system as set forth in claim 14,
(a) counting means for counting the number of successive increment-advance signals delivered, and connected to receive said character match output signal to be reset to zero thereby;
(b) said counting means having a "failure" output operative after a preset number of counts;
(c) keyboard means for manually inserting a character into the system, and said keyboard means being coupled to the system in response to a "failure" signal;
(d) and means connected with the keyboard means to deliver a character-match output signal to the system when a character has been manually inserted.

16. In a system as set forth in claim 15,
(a) first code means on said moving means delivering a unique identification code for each character mask entering said zone;
(b) second code means operated by said keyboard means and delivering a similar unique code for each keyboard character;
(c) coincidence determining means receiving said first and second codes and comprising said means to deliver a match output-signal when the codes are identical.

17. In a system as set forth in claim 14,
(a) said character masks being arranged in a cyclic sequence on said moving member with the characters which have similar characteristic components disposed in the sequence with the simplest characters first followed by similar characters in the order of increasing complexity;
(b) and said means for turning off said enabling means operating to prevent a second match from occurring during the same sequence cycle.

18. In a system as set forth in claim 13, said moving member comprising a rotating member with at least one annular band of character masks, the axis of rotation being disposed substantially parallel with the line of print directed toward said character-recognition zone.

19. An improved system for automatically scanning and recognizing printed characters and transposing them into unique character-identifying codes, the system being of the type including means for projecting the characters in a document, automatic means for scanning the characters on each line of print and for directing them one at a time toward a character-recognition zone, a moving member having a complete font of character masks each associated with means for delivering a code identifying a matched character and the masks passing through said zone and intersecting the path of characters projected thereonto, the improvement comprising:
(a) a multiple adjacent annular bands on said moving member including in separate bands character-recognition masks, and character set-width indicating codes;
(b) photosensitive cell means disposed opposite each band including a character-match cell, and a group of set-width code reading cells;
(c) a character-intensity reading cell disposed to receive light from each character projected into said recognition zone to determine the relative light intensities of the various characters projected;
(d) character match determining means connected to said character-match cell and having adjustable threshold means sensitive to the degree to which light from a projected character is interrupted by character masks on said moving member, said adjustable means being connected to said intensity cell to adjust the threshold in proportion to the projected relative light intensities to make the match-determining means relatively more sensitive when seeking a match with respect to a projected character of relatively smaller total intensity, and the match determining means delivering an output signal in response to a character match;
(e) means responsive to said signal to enable said code reading cells to read out the set-width of the matched character; and
(f) means responsive to said set-width and to said output signal to advance said scanning means by a distance proportional to said set-width along the line of characters being scanned.

20. In a system as set forth in claim 19, means for determining whether light from a projected character is present in said recognition zone and for maintaining said scanning means continuously advancing when no light is present and for halting its advance when light from a projected character enters said zone.

References Cited

UNITED STATES PATENTS 2,769,379 11/1956 Perry ---------------- 95—4.5

MAYNARD R. WILBUR, *Primary Examiner.*

J. SHERIDAN, *Assistant Examiner.*